(12) United States Patent
Wang

(10) Patent No.: US 7,715,179 B2
(45) Date of Patent: May 11, 2010

(54) POWER SUPPLY FOR A COMPUTER DEVICE

(75) Inventor: Bill Wang, Tainan County (TW)

(73) Assignee: Compucase Enterprise Co., Ltd., Tainan (TW)

( * ) Notice: Subject to any disclaimer, the term of this patent is extended or adjusted under 35 U.S.C. 154(b) by 80 days.

(21) Appl. No.: 12/211,874

(22) Filed: Sep. 17, 2008

(65) Prior Publication Data

US 2009/0290293 A1 Nov. 26, 2009

(30) Foreign Application Priority Data

May 21, 2008 (TW) .............................. 97118664 A

(51) Int. Cl.
*G06F 1/16* (2006.01)
(52) U.S. Cl. .................. 361/679.02; 439/347; 455/557; 713/340; 345/157
(58) Field of Classification Search ................. 361/601, 361/679.55, 679.02, 679.04, 679.09, 679.39, 361/679.56; 439/61, 65, 347, 660; 455/418, 455/557, 558, 573, 574; 713/330, 300, 323, 713/320, 340; 711/115; 345/1.1, 8, 157, 345/211

See application file for complete search history.

(56) References Cited

U.S. PATENT DOCUMENTS

| 6,700,778 B1 * | 3/2004 | Wang | 361/690 |
| 2004/0066622 A1 * | 4/2004 | Wang | 361/695 |
| 2007/0167073 A1 * | 7/2007 | Tsai | 439/554 |

* cited by examiner

*Primary Examiner*—Hung V Duong
(74) *Attorney, Agent, or Firm*—Hammer & Associates, P.C.

(57) ABSTRACT

A power supply includes a casing mounted in a computer housing, a power module disposed in the casing, and an electrical socket and a switch module embedded in an exposed side wall of the casing. The switch module includes an operating unit mounted movably in a mounting seat, and operable so as to move among a first position adjacent to the side wall, where two terminal units coupled respectively to the electrical socket and the power module disconnect electrically from each other such that the switch module is in an OFF mode, a second position distal from the side wall, and a third position between the first and second positions, where a conducting member contacts electrically the terminal units such that the switch module is in an ON mode. When the switch module is switched from the ON mode to the OFF mode, the operating unit is moved from the third position to the first position via the second position.

8 Claims, 11 Drawing Sheets

POWER SUPPLY FOR A COMPUTER DEVICE

CROSS-REFERENCE TO RELATED APPLICATION

This application claims priority of Taiwanese Application No. 097118664, filed on May 21, 2008.

BACKGROUND OF THE INVENTION

1. Field of the Invention

The invention relates to a power supply, more particularly to a power supply for a computer device.

2. Description of the Related Art

Referring to FIGS. 1 and 2, a conventional power supply 1 for a computer device is shown to include a casing 10, a power module 14, an electrical socket 15, a switch unit 16, and a fan module 13. The casing 10 is adapted to be mounted in a computer housing (not shown) of the computer device, and includes complementary upper and lower casing parts 11, 12 configured with an inner receiving space therebetween, as shown in FIG. 2. The power module 14 is disposed in the inner receiving space and is coupled to the fan module 13. The electrical socket 15 is embedded in an exposed side wall 121 of the lower casing part 12, and is adapted to be coupled to an external power source (not shown), such as a commercial power source, via a cord. The switch unit 16 is mounted to the side wall 121 of the lower casing part 12, and interconnects electrically the electrical socket 15 and the power module 14. The switch unit 16 is operable between an OFF mode, where the electrical socket 15 is not connected electrically to the power module 14, and an ON mode, where the electrical socket 15 is connected electrically to the power module 14 such that the power module 14 receives electric power from the external power source via the cord and the electrical socket 15, and processes the electrical power so as to supply an electric power to the fan unit 13 and the computer device.

It is noted that the switch unit 16 includes an inclined operating key 161. The switch unit 16 is switched from one of the ON and OFF modes to the other one of the ON and OFF modes by pressing the operating key 161. Since the operating key 161 projects outwardly from the side wall 121, unintentional operation of the operating key 161 easily occurs.

SUMMARY OF THE INVENTION

Therefore, an object of the present invention is to provide a power supply for a computer device that can overcome the aforesaid drawback of the prior art.

According to the present invention, there is provided a power supply for a computer device. The computer device includes a computer housing. The power supply comprises:

a casing having a side wall and adapted to be mounted in the computer housing so that the side wall of the casing is exposed outwardly of the computer housing;

a power module disposed in the casing;

an electrical socket embedded in the side wall of the casing; and a switch module embedded in the sidewall of the casing, electrically interconnecting the power module and the electrical socket, and operable between an ON mode, where the electrical socket is connected electrically to the power module, and an OFF mode, where the electrical socket is not connected electrically to the power module, the switch module including a mounting seat embedded in the side wall of the casing, configured with an inner receiving space, and having a first open end in spatial communication with the inner receiving space, and a second end opposite to the first open end in a first direction, first and second terminal units mounted to the second end of the mounting seat and spaced apart from each other, each of the first and second terminal units having a contact end portion disposed in the inner receiving space in the mounting seat, and a connecting end portion opposite to the contact end portion, extending outwardly of the second end of the mounting seat and coupled to a corresponding one of the power module and the electrical socket, and an operating unit mounted movably in the inner receiving space in the mounting seat and including a conducting member, the operating unit being operable so as to move in the first direction among a first position, where the operating unit is adjacent to the first open end of the mounting seat and where the conducting member is spaced apart from the contact end portions of the first and second terminal units, a second position, where the operating unit is distal from the first open end of the mounting seat and where the conducting member contacts electrically the contact end portions of the first and second terminal units, and a third position between the first and second positions, where the conducting member contacts electrically the contact end portions of the first and second terminal units.

The switch module is in the OFF mode when the operating unit is at the first position, and is in the ON mode when the operating unit is at the third position.

The operating unit of the switch module is moved from the first position to the third position via the second position when the switch module is switched from the OFF mode to the ON mode, and is moved from the third position to the first position via the second position when the switch module is switched from the ON mode to the OFF mode.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
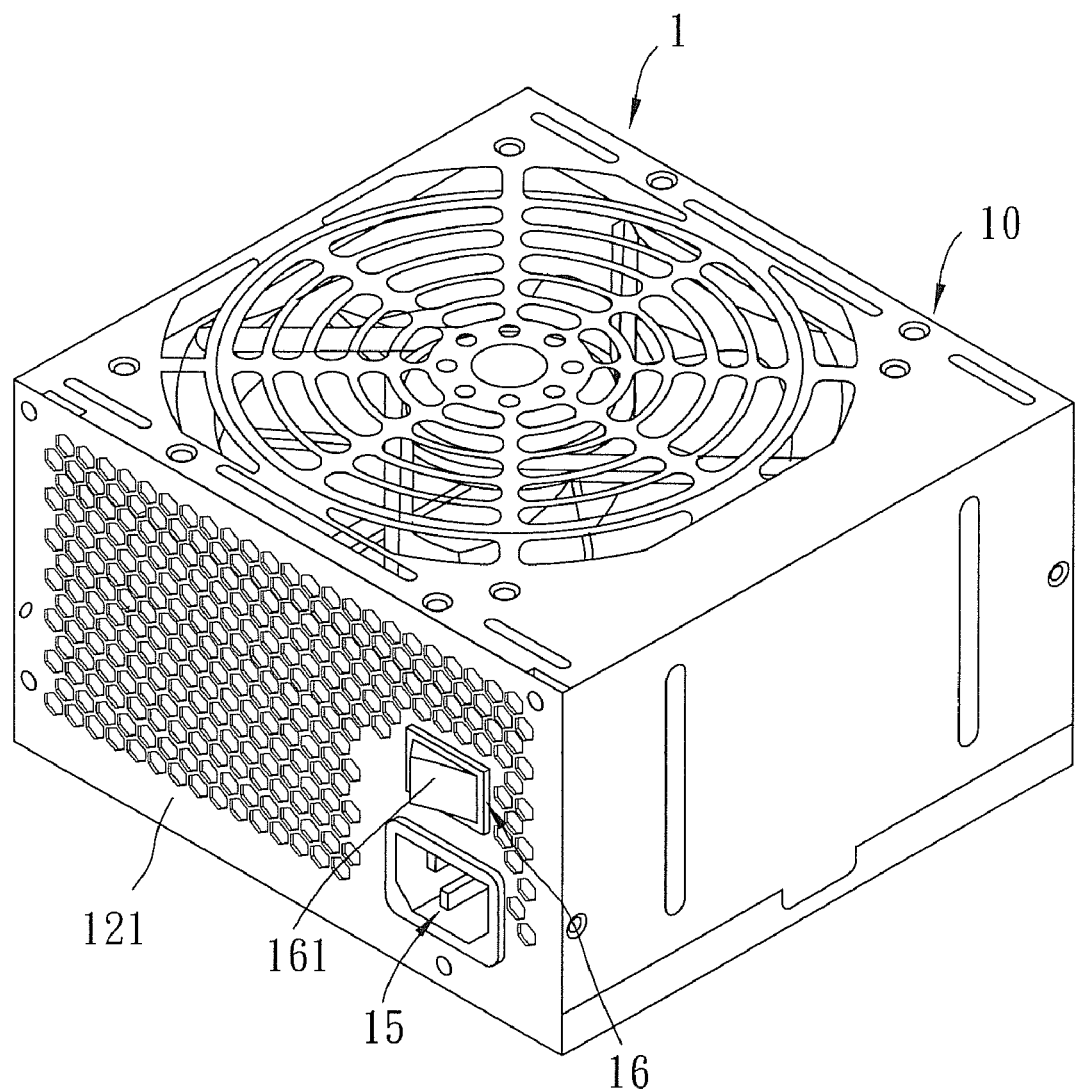
FIG. 1 is a perspective view of a conventional power supply.
Figure 2:
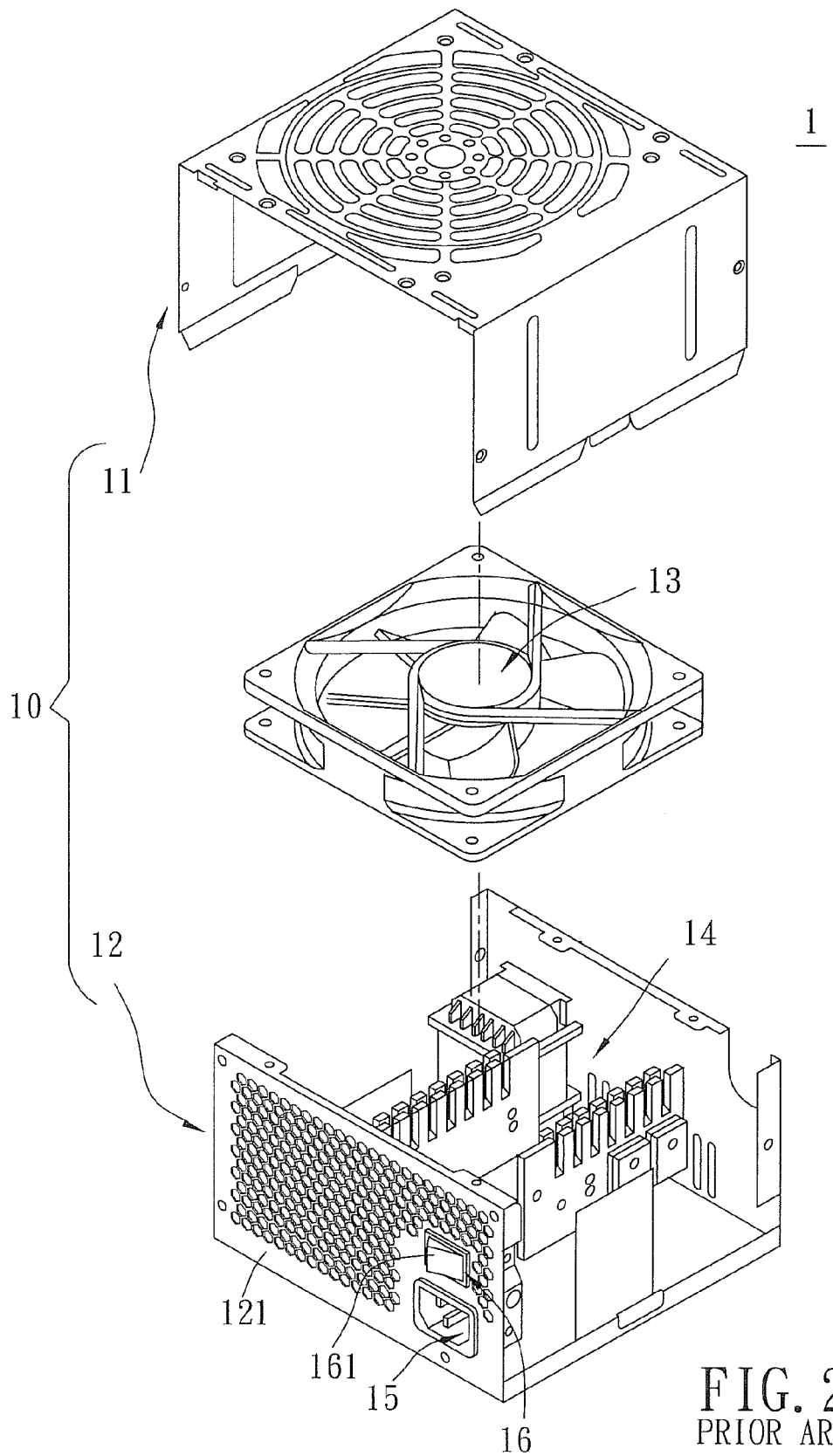
FIG. 2 is a partly exploded perspective view of the conventional power supply.
Figure 3:
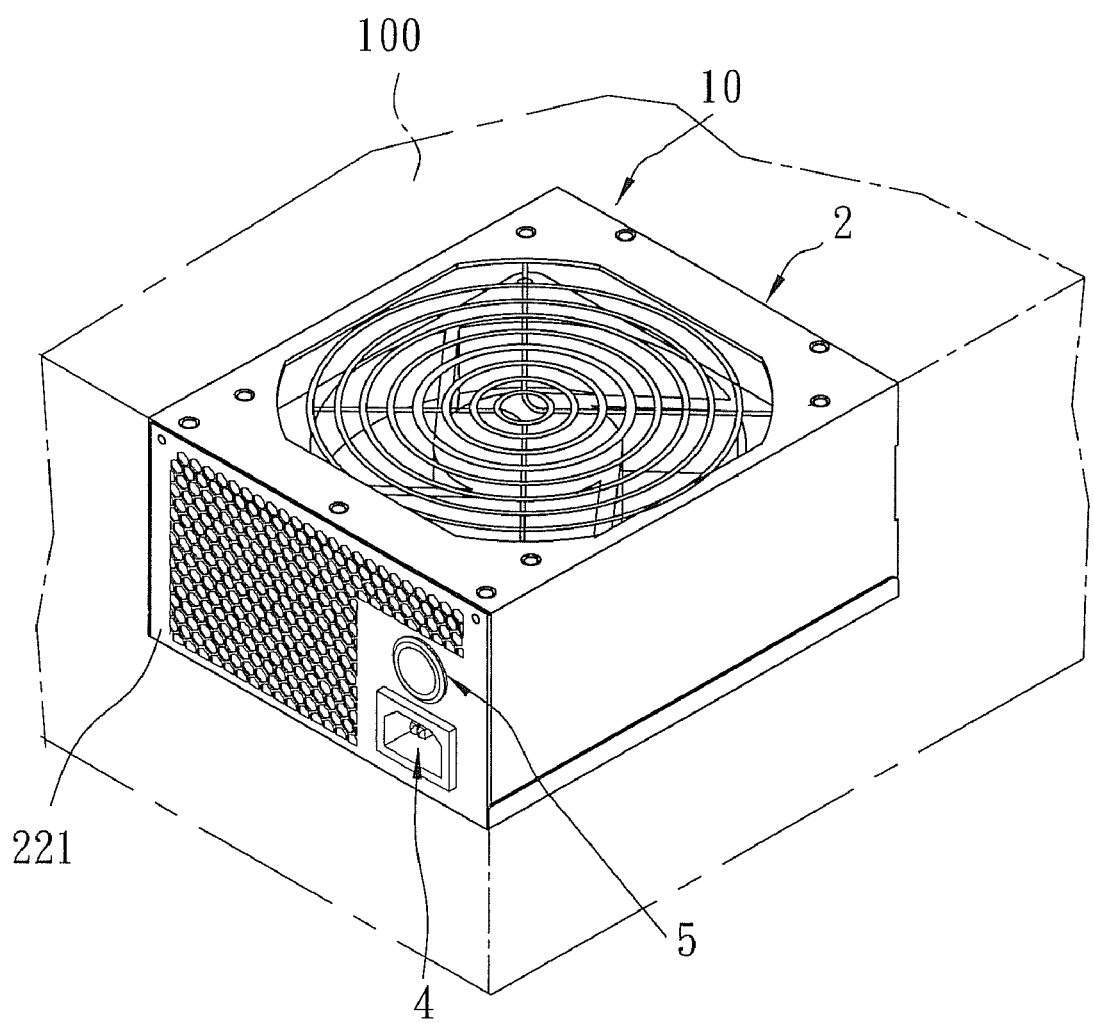
FIG. 3 is a perspective view showing the preferred embodiment of a power supply according to the present invention.
Figure 4:
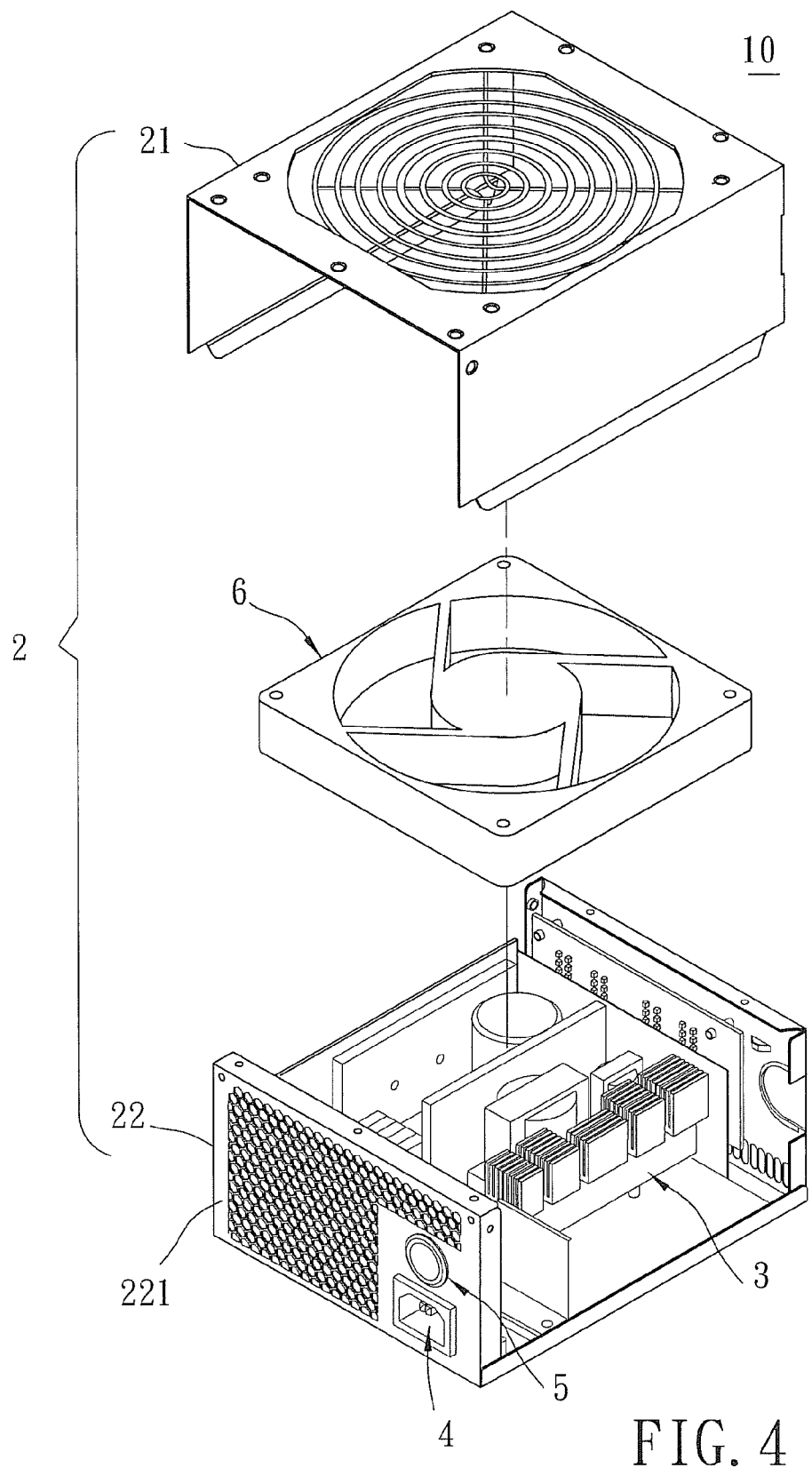
FIG. 4 is a partly exploded perspective view showing the preferred embodiment.
Figure 5:
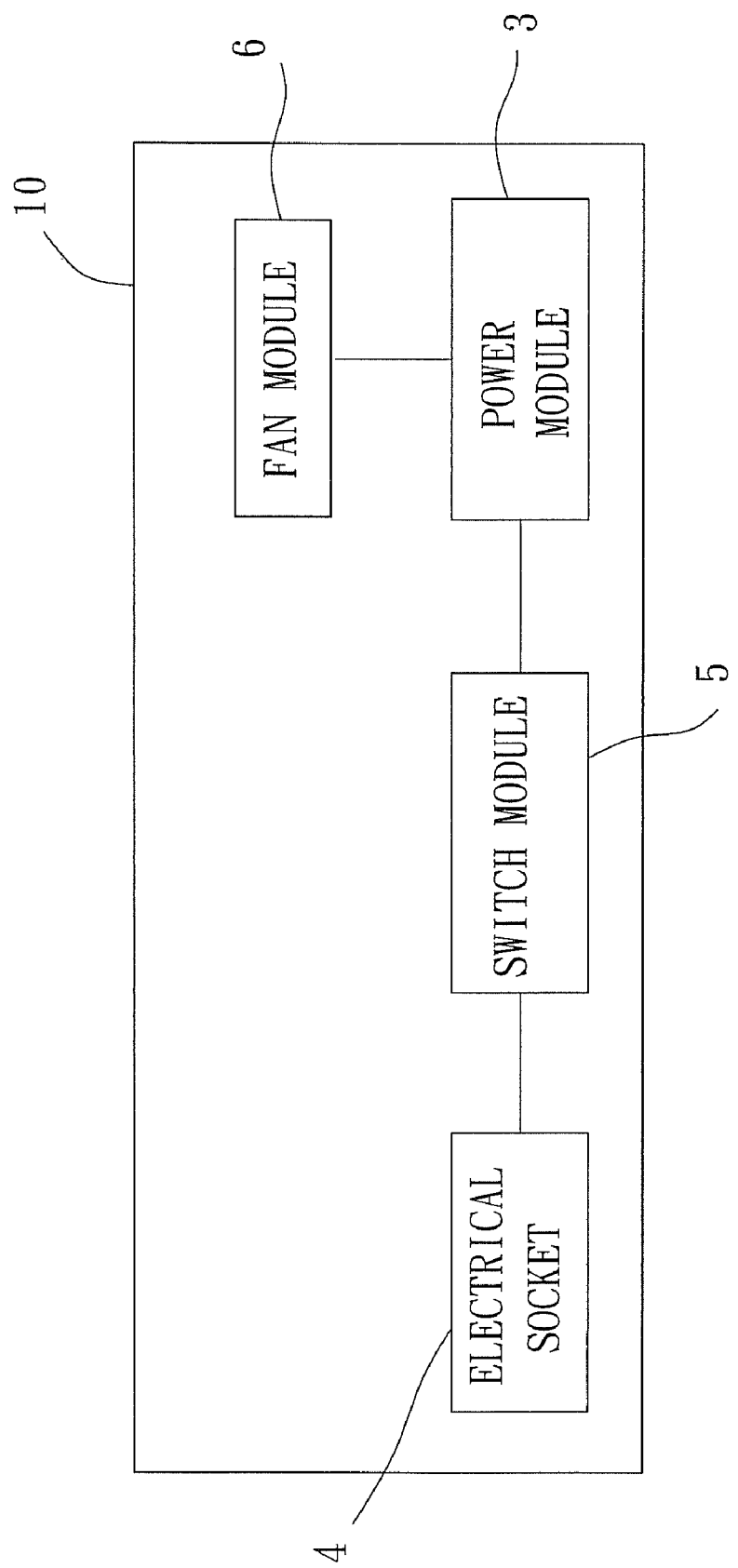
FIG. 5 is a schematic circuit block diagram illustrating the preferred embodiment.

Referring to FIGS. 3 to 5, the preferred embodiment of a power supply 10 for a computer device (not shown) according to the present invention is shown to include a casing 2, a power module 3, an electrical socket 4, a switch module 5, and a fan module 6. The computer device, such as a desktop computer, includes a computer housing 100.

The casing 2 has a side wall 221, and is adapted to be mounted in the computer housing 100 so that the side wall 221 is exposed outwardly of the computer housing 100, as shown in FIG. 3. In this embodiment, the casing 2 includes complementary first and second casing parts 21, 22, wherein the second casing part 22 has the side wall 221, as shown in FIG. 4.

The power module 3 is disposed in the casing 2.

The fan module 6 is disposed in the casing 2 and is coupled to the power module 3.

The electrical socket 4 is embedded in the side wall 221 of the casing 2, and is adapted to be connected electrically to an external power source (not shown) such as a commercial power source, via a cord (not shown).

Figure 6:
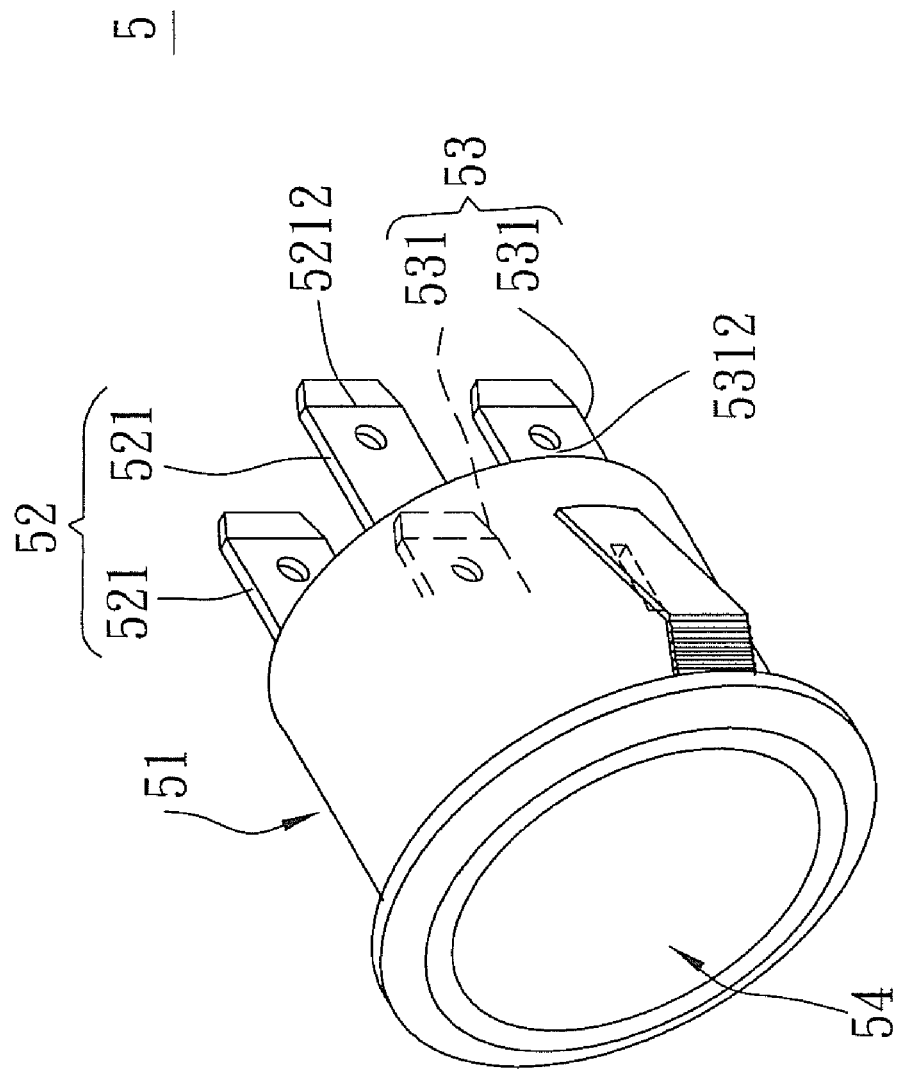
FIG. 6 is a perspective view showing a switch module of the preferred embodiment.
Figure 7:
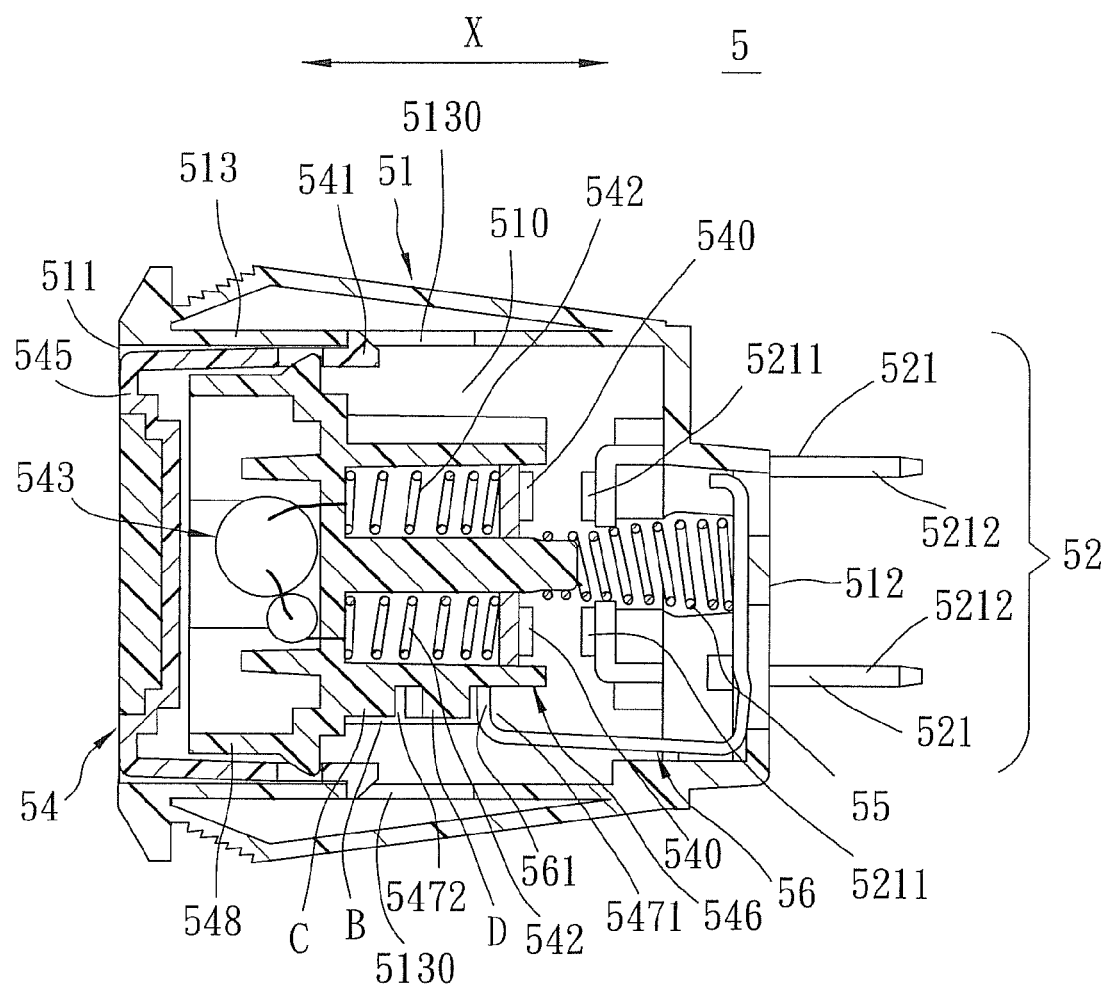
FIG. 7 is a schematic sectional view showing the preferred embodiment when the switch module is in an OFF mode.

The switch module 5 is embedded in the side wall 221 of the casing 2 (see FIG. 3) and electrically interconnects the power module 3 and the electrical socket 4 (see FIG. 5). The switch module 5 is operable between an ON mode, where the electrical socket 4 is connected electrically to the power module 3 such that the power module 3 receives electric power from the external power source via the cord and the electrical socket 4, and processes the electrical power so as to supply an electric power to the fan module 6 and the computer device. Referring further to FIGS. 6 and 7, the switch module 5 includes a mounting seat 51, first and second terminal units 52, 53, an operating unit 54, a biasing member 55, and an L-shaped anchoring member 56.

The mounting seat 51 is embedded in the side wall 221 of the casing 2, is configured with an inner receiving space 510, and has a first open end 511 in spatial communication with the inner receiving space 510, and a second end 512 opposite to the first open end 511 in the first direction (X). In this embodiment, the mounting seat 51 has an annular surrounding wall 513 extending between the first open end 511 and the second end 512, and formed with opposite engaging slots 5130 that extend in the first direction (X) (see FIG. 7).

Figure 6A:
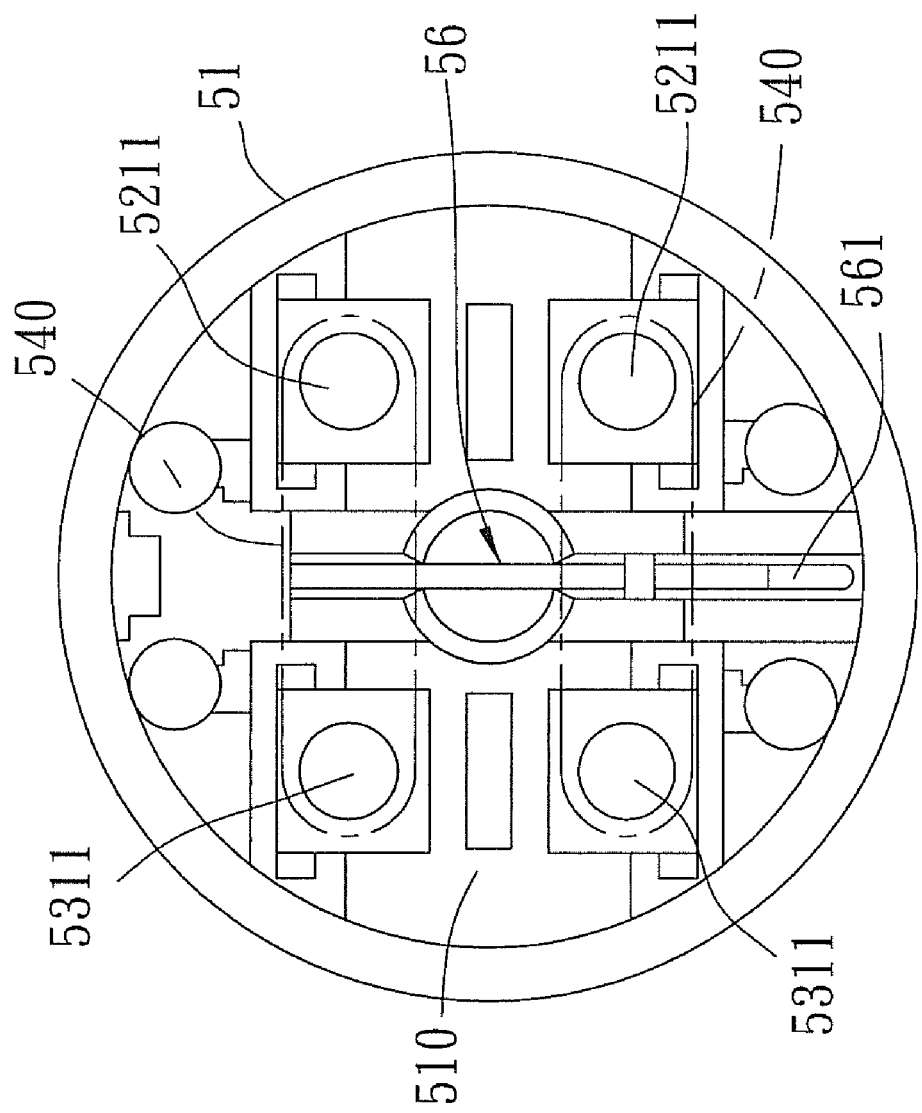
FIG. 6a is a schematic view showing the switch module of the preferred embodiment without an operating unit and a biasing member.

The first and second terminal units 52, 53 are mounted to the second end 512 of the mounting seat 51, and are spaced apart from each other. In this embodiment, the first terminal unit 52 includes two first terminals 521, each having a contact end 5211 disposed in the inner receiving space 510 in the mounting seat 51 (see FIG. 7), and a connecting end 5212 opposite to the contact end 5211 and extending outwardly of the second end 512 of the mounting seat 51 (see FIG. 6). As such, the contact ends 5211 of the first terminals 521 consti-tute a contact end portion of the first terminal unit 52, and the connecting ends 5212 of the first terminals 521 constitute a connecting end portion of the first terminal unit 52 that is coupled to one of the power module 3 and the electrical socket 4. Similarly, the second terminal unit 53 includes two second terminals 531, each having a contact end 5311 disposed in the inner receiving space 510 in the mounting seat 51 (see FIG. 6a), and a connecting end 5312 opposite to the contact end 5311 and extending outwardly of the second end 512 of the mounting seat 51 (see FIG. 6) As such, the contact ends 5311 of the second terminals 531 constitute a contact end portion of the second terminal unit 53, and the connecting ends 5312 of the second terminals 531 constitute a connecting end portion of the second terminal unit 53 that is coupled to the other one of the power module 3 and the electrical socket 4.

The operating unit 54 is mounted movably in the inner receiving space 510 in the mounting seat 51. In this embodiment, as shown in FIG. 7, the operating unit 54 includes a main frame unit, a conducting member, a spring unit, and a lighting unit 543. The main frame unit includes a main frame 548 having an engaging end portion disposed adjacent to the second end 512 of the mounting seat 51. The conducting member includes two conductive pieces 540 mounted spacedly and movably on the engaging end portion of the main frame 548. The spring unit includes two coil springs 542 mounted in the engaging end portion of the main frame 548 and connected electrically and respectively to the conductive pieces 540 of the conducting member for biasing the conductive pieces 540 to move in the first direction (X) toward the second end 512 of the mounting seat 51. The lighting unit 543 is mounted on the main frame 548, is disposed adjacent to the first open end 511 of the mounting seat 51, and is connected electrically to the conductive pieces 540 of the conducting member via the coil springs 542 of the spring unit. The main frame unit further includes a transparent cap 545 mounted on the main frame 548 for covering the lighting unit 543.

Figure 8:
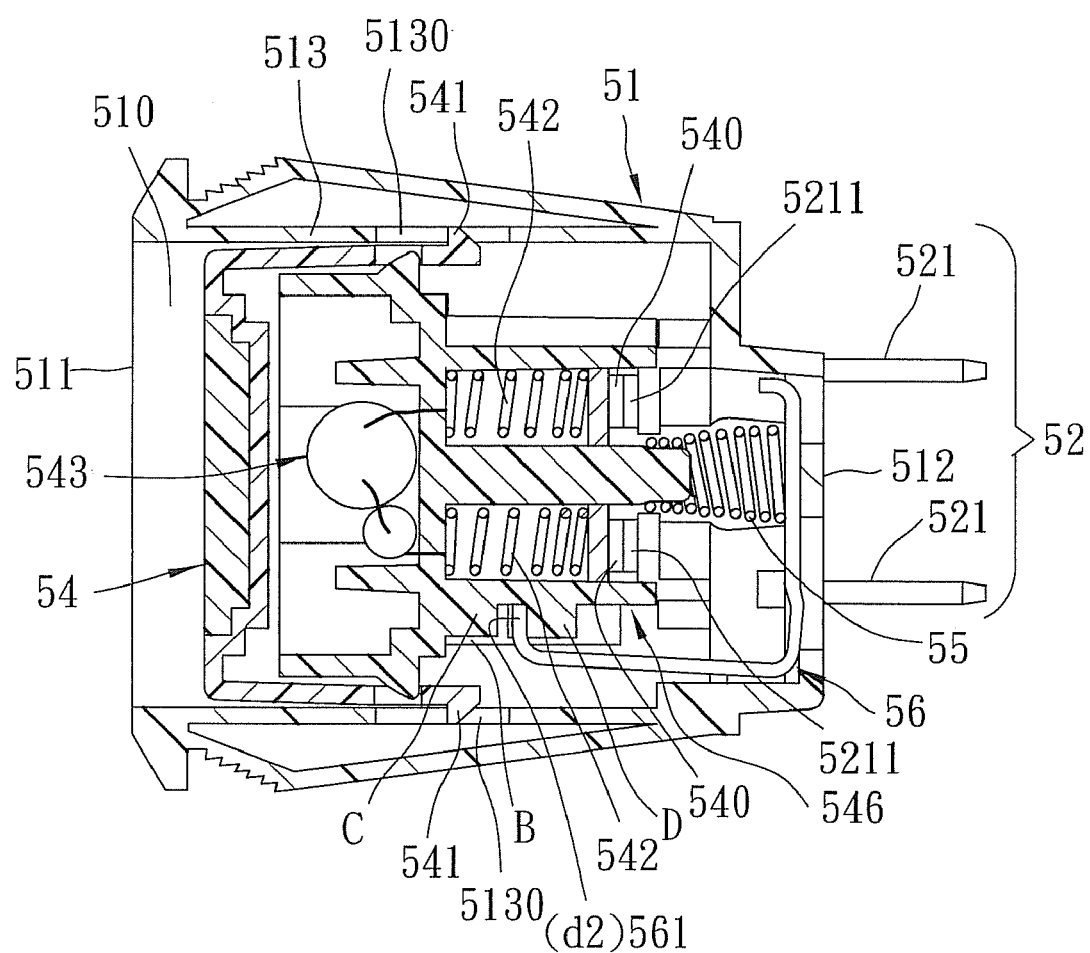
FIG. 8 is a schematic sectional view showing the preferred embodiment when the switch module is in an ON mode.
Figure 9:
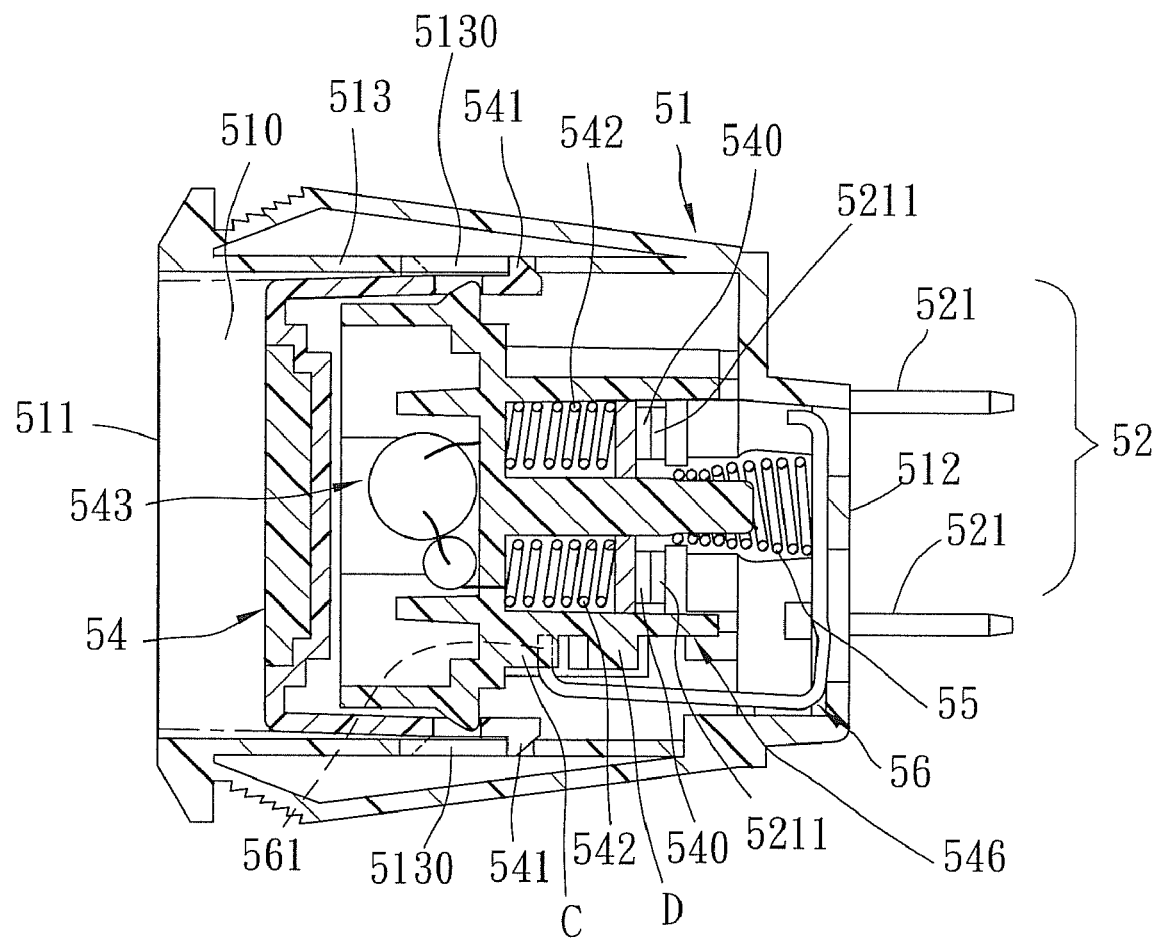
FIG. 9 is a schematic sectional view showing the preferred embodiment when an operating unit of the switch module is at a second position.

The operating unit 54 is operable so as to move in the first direction (X) among a first position, where the operating unit 54 is adjacent to the first open end 511 of the mounting seat 51 and where the conductive pieces 540 of the conducting member are spaced apart from the contact ends 5211, 5311 of the first and second terminals 521, 531 of the first and second terminal units 52, 53, as shown in FIG. 7, a second position, where the operating unit 54 is distal from the first open end 511 of the mounting seat 51 and where each of the conductive pieces 540 of the conducting member contacts electrically the contact end 5211 of a corresponding one of the first terminals 521 of the first terminal unit 52 and the contact end 5311 of a corresponding one of the second terminals 531 of the second terminal unit 53, as shown in FIG. 9, and a third position between the first and second positions, where the each of the conductive pieces 540 of the conducting member contacts electrically the contact end 5211 of a corresponding one of the first terminals 521 of the first terminal unit 52 and the contact end 5311 of a corresponding one of the second terminals 531 of the second terminal unit 53 by virtue of a restoration force of each coil spring 542 of the spring unit, as shown in FIG. 8. In this embodiment, the transparent cap 545 has a cap body, and two engaging hooks 541 connected integrally to the cap body and engaging movably the engaging slots 5130 in the annular surrounding wall 513 of the mounting seat 51, respectively, as shown in FIG. 7, so as to permit movement of the operating unit 54 between the first and second positions.

The switch module 5 is in the OFF mode when the operating unit 54 is at the first position, and is in the ON mode when the operating unit 54 is at the third position. The operating unit 54 of the switch module 5 is moved from the first position to the third position via the second position when the switch module 5 is switched from the OFF mode to the ON mode, and is moved from the third position to the first position via the second position when the switch module 5 is switched from the ON mode to the OFF mode.

In this embodiment, as shown in FIG. 7, the biasing member 55 includes a coil spring disposed in the inner receiving space 510 between the second end 512 of the mounting seat 51 and the engaging end portion of the main frame 548 of the operating unit 54 for biasing the operating unit 54 to move in the first direction (X) toward the first open end 511 of the mounting seat 51.

Figure 10:
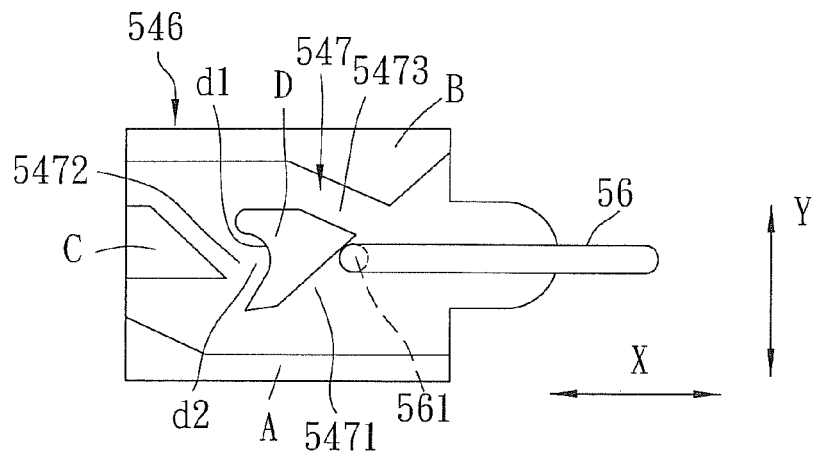
FIG. 10 is a schematic view illustrating a relationship between a guiding groove and an anchoring member of the preferred embodiment when the switch module is in the OFF mode.
Figure 11:
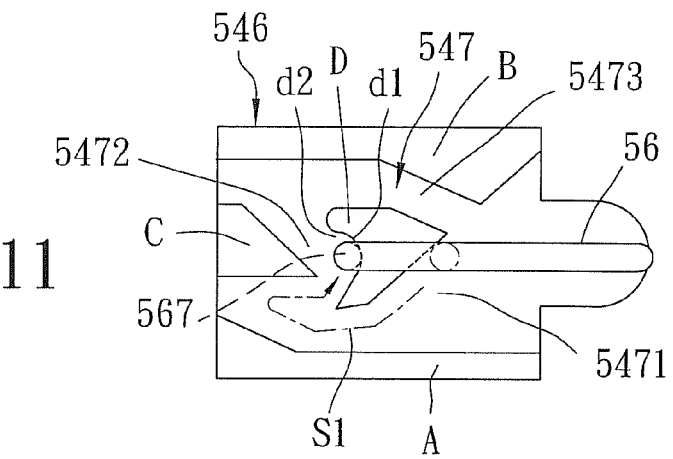
FIG. 11 is a schematic view illustrating a relationship between the guiding groove and the anchoring member of the preferred embodiment when the switch module is switched from the OFF mode to the ON mode.
Figure 12:
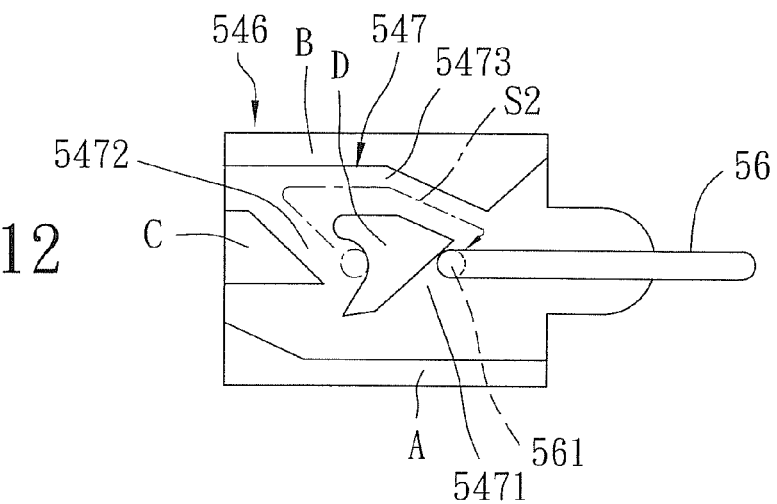
FIG. 12 is a schematic view illustrating a relationship between the guiding groove and the anchoring member when the switch module is switched from the ON mode to the OFF mode.

In this embodiment, referring further to FIGS. 10 to 12, the engaging end portion of the main frame 548 of the operating unit 54 of the switch module 5 has a plate body 546 extending in the first direction (X) (see FIG. 7) and formed with a looped guiding groove 547 that has first, second and third groove portions 5471, 5472, 5473 in spatial communication with each other, wherein the second groove portion 5472 is adjacent to the first open end 511 of the mounting seat 51, and the first groove portion 5471 is distal from the first open end 511 of the mounting seat 51 (see FIG. 7). As shown in FIG. 7, the plate body 546 has first and second protrusions (A, B) spaced apart from each other in a second direction (Y) perpendicular to the first direction (X), and third and fourth protrusions (C, D) disposed between the first and second protrusions (A, B) and spaced apart from each other in the first direction (X), such that the first groove portion 5471 is defined between the first and fourth protrusions (A, D), that the second groove portion 5472 is defined between the third and fourth protrusions (C, D), and that the third groove portion 5473 is defined between the second and fourth protrusions (B, D). It is noted that the fourth protrusion (D) has a curved surface (d1) corresponding to the third protrusion (C). The anchoring member 56 is disposed in the inner receiving space 510 in the mounting seat 51 (see FIG. 7), and has a hook end 561 engaging movably the guiding groove 547. When the operating unit 54 is moved from the first position to the third position via the second position, the hook end 561 of the anchoring member 56 moves along the first groove portion 5471 and into the second groove portion 5472, i.e., the hook end 561 of the anchoring member 56 moves along a path as indicated by an imaginary line (S1) of FIG. 11. On the other hand, when the operating unit 54 is moved from the third position to the first position via the second position, the hook end 561 of the anchoring member 56 moves along the second and third groove portions 5472, 5473 and into the first groove portion 5471, i.e., the hook end 561 of the anchoring member 56 moves along a path as indicated by an imaginary line (S2) of FIG. 12. It is noted that, when the operating unit 54 is at the third position, the hook end 561 of the anchoring member 56 is retained in a recess (d2) defined by the curved surface (d1) of the fourth protrusion (D) of the plate body 546 by virtue of a restoration force of the biasing member 55, as shown in FIGS. 8 and 11. Therefore, the operating unit 54 is effectively positioned in the third position.

In operation, when the operating unit 54 is pressed to move from the first position to the second position, and then moves from the second position to the third position by virtue of the restoration force of the biasing member 55, the switch module 5 is switched from the OFF mode to the ON mode. Thereafter, when the operating unit 54 is pressed again to move from the third position to the second position such that the hook end 561 of the anchoring member 56 disengages the recess (d2) in the fourth protrusion (D) of the plate body 546, and then moves from the second position to the first position by virtue of the restoration force of the biasing member 55, the switch module 5 is switched from the ON mode to the OFF mode.

In sum, since the operating unit 54 of the switch module 5 is fully disposed in the mounting seat 51 and is effectively positioned in the third position when the switch module 5 is in the ON mode (see FIG. 8), unintentional operation of the operating unit 54 as encountered in the prior art can be avoided.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A power supply for a computer device, the computer device including a computer housing, said power supply comprising:

a casing having a side wall and adapted to be mounted in the computer housing so that said side wall of said casing is exposed outwardly of the computer housing;

a power module disposed in said casing;

an electrical socket embedded in said side wall of said casing; and a switch module embedded in said side wall of said casing, electrically interconnecting said power module and said electrical socket, and operable between an ON mode, where said electrical socket is connected electrically to said power module, and an OFF mode, where said electrical socket is not connected electrically to said power module, said switch module including a mounting seat embedded in said side wall of said casing, configured with an inner receiving space, and having a first open end in spatial communication with said inner receiving space, and a second end opposite to said first open end in a first direction, first and second terminal units mounted to said second end of said mounting seat and spaced apart from each other, each of said first and second terminal units having a contact end portion disposed in said inner receiving space in said mounting seat, and a connecting end portion opposite to said contact end portion, extending outwardly of said second end of said mounting seat and coupled to a corresponding one of said power module and said electrical socket, and an operating unit mounted movably in said inner receiving space in said mounting seat and including a conducting member, said operating unit being operable so as to move in the first direction among a first position, where said operating unit is adjacent to said first open end of said mounting seat and where said conducting member is spaced apart from said contact end portions of said first and second terminal units, a second position, where said operating unit is distal from said first open end of said mounting seat and where said conducting member contacts electrically said contact end portions of said first and second terminal units, and a third position between the first and second positions, where said conducting member contacts electrically said contact end portions of said first and second terminal units;

wherein said switch module is in the OFF mode when said operating unit is at the first position, and is in the ON mode when said operating unit is at the third position; and wherein said operating unit of said switch module is moved from the first position to the third position via the second position when said switch module is switched from the OFF mode to the ON mode, and is moved from the third position to the first position via the second position when said switch module is switched from the ON mode to the OFF mode.

2. The power supply as claimed in claim 1, wherein said switch module further includes a biasing member for biasing said operating unit to move in the first direction toward said first open end of said mounting seat.

3. The power supply as claimed in claim 2, wherein said biasing member includes a coil spring disposed in said inner receiving space between said second end of said mounting seat and said operating unit.

4. The power supply as claimed in claim 2, wherein:
said mounting seat of said switch module further has an annular surrounding wall extending between said first open end and said second end, and formed with at least one engaging slot that extends in the first direction; and
said operating unit of said switch module further includes a main frame unit having an engaging end portion disposed adjacent to said second end of said mounting seat and mounted movably with said conducting member thereon, and at least one engaging hook that movably engages said engaging slot in said annular surrounding wall of said mounting seat so as to permit movement of said operating unit between the first and second positions.

5. The power supply as claimed in claim 4, wherein said operating unit of said switch module further includes a spring unit mounted to said engaging end portion of said main frame unit and connected electrically to said conducting member for biasing said conducting member to move in the first direction toward said second end of said mounting seat.

6. The power supply as claimed in claim 5, wherein:
said operating unit of said switch module further includes a lighting unit mounted to said main frame unit, disposed adjacent to said first open end of said mounting seat and connected electrically to said conducting member through said spring unit; and
said main frame unit of said operating unit of said switch module further has a transparent cap for covering said lighting unit.

7. The power supply as claimed in claim 4, wherein:
said engaging end portion of said main frame unit of said operating unit of said switch module has a plate body extending in the first direction and formed with a looped guiding groove that has first, second and groove portions in spatial communication with each other, said second groove portion being adjacent to said first open end of said mounting seat, said first groove portion being distal from said first open end of said mounting seat, said plate body having first and second protrusions spaced apart from each other in a second direction perpendicular to the first direction, and third and fourth protrusions disposed between said first and second protrusions and spaced apart from each other in the first direction, such that said first groove portion is defined between said first and fourth protrusions, that said second groove portion is defined between said third and fourth protrusions, and that said third groove portion is defined between said second and fourth protrusions, said fourth protrusion having a curved surface corresponding to said third protrusion;
said switch module further includes an anchoring member disposed in said inner receiving space in said mounting seat and having a hook end engaging movably said guiding groove; and
said hook end of said anchoring member moves along said first groove portion and into said second groove portion when said operating unit is moved from the first position to the third positions via the second position, and moves along said second and third groove portions and into said first groove portion when said operating unit is moved from the third portion to the first position via the second position, said hook end of said anchoring member being retained in a recess defined by said curved surface of said fourth protrusion of said plate body by virtue of a restoration force of said biasing member when said operating unit is at the third position.

8. The power supply as claimed in claim 1, further comprising a fan module disposed in said casing and coupled to said power module.

* * * * *